United States Patent [19]

Justice, Jr.

[11] Patent Number: 4,980,874
[45] Date of Patent: Dec. 25, 1990

[54] METHOD AND APPARATUS FOR MAXIMIZING SEISMIC SHEAR WAVE PRODUCTION

[75] Inventor: Mahlon G. Justice, Jr., Plano, Tex.

[73] Assignee: Atlantic Richfield Company, Los Angeles, Calif.

[21] Appl. No.: 359,151

[22] Filed: May 31, 1989

[51] Int. Cl.$^5$ .......................................... H04R 23/00
[52] U.S. Cl. ..................................... 367/190; 367/75; 181/121; 181/114
[58] Field of Search ......................... 367/189, 190, 75; 181/113, 114, 121

[56] References Cited

U.S. PATENT DOCUMENTS

| | | | |
|---|---|---|---|
| 4,321,981 | 3/1982 | Waters | 181/119 |
| 4,655,314 | 4/1987 | Airhart | 181/113 |
| 4,660,674 | 4/1987 | Airhart | 181/113 |
| 4,660,675 | 4/1987 | Airhart | 181/113 |
| 4,662,473 | 5/1987 | Betz | 181/113 |
| 4,683,558 | 7/1987 | Karner | 367/189 |
| 4,706,231 | 11/1987 | Mueller et al. | 367/190 |
| 4,719,607 | 1/1988 | Airhart | 367/189 |
| 4,782,446 | 11/1988 | Ehler et al. | 364/421 |

Primary Examiner—Deborah L. Kyle
Assistant Examiner—J. Woodrow Eldred
Attorney, Agent, or Firm—Roy L. Van Winkle

[57] ABSTRACT

An apparatus and method for maximizing the shear wave energy imparted into the soil upon the impacting of a base plate by an impact mass from a seismic generator. A seismic generator is disposed at an angle relative to a line generally perpendicular to the surface to the ground. The angle varies with soil conditions and the angle is determined by locating an accelerometer on the base plate of the generator and observing the horizontal acceleration rate as indicated by the accelerometer. If the acceleration rate exceeds a predetermined value, the anguular disposition of the generator s changed to decrease the angle either manually or automatically until the acceleration rate no longer exceeds a predetermined value.

9 Claims, 1 Drawing Sheet

METHOD AND APPARATUS FOR MAXIMIZING SEISMIC SHEAR WAVE PRODUCTION

FIELD OF THE INVENTION

This invention relates generally to apparatus for producing seismic signals. More particularly, but not by way of limitation, this invention relates to methods and apparatus for maximizing shear waves produced by an impact type seismic generator.

BACKGROUND OF THE INVENTION:

In connection with the search for petroleum and natural gas, seismic surveying has been performed for many years. Originally, dynamite or TNT was utilized by exploding it on the surface or in a bore hole to create compressional seismic waves that are reflected or refracted by geological structures within the earth. It is possible, by the use of geophones located on the surface of the earth, to receive and respond to these seismic waves. Such waves are converted into electrical signals which are recorded and interpreted to enable geologists to plot in three dimensions the underground structural configuration.

More recently, either vibrators or hydraulic or pneumatically actuated devices for impacting a base plate located in intimate contact with the ground have been utilized to generate seismic waves. Both compressional and shear waves may be generated. It has been determined that, geologically, an interpretation can be made of shear waves to provide additional information beyond that which can be obtained from compression waves.

In order to produce shear waves, apparatus similar to that shown in U.S. Pat. No. 4,712,641, issued Dec. 15, 1987, to Stephen V. Chelminski are frequently employed. The seismic source or generator disclosed therein utilizes an air gun to produce a powerful shock through a base plate mounted in intimate contact with the earth. The airgun is pivoted on the base plate and the tilting thereof is utilized to direct such shock at an angle relative to the surface vertical and consequently to create horizontally polarized shear waves.

Another example of mobile apparatus that includes a seismic generator capable of producing the desired seismic waves is illustrated in U.S. Pat. No. 4,660,674, issued Apr. 28, 1987 to Tom P. Airhart. In that patent a heavy mass is pivotally mounted on a frame carried by the vehicle. The mass is propelled at high velocity into a base plate that is located on the surface of the ground. The impact force is translated into the desired form of seismic waves.

Among the problems involved in such apparatus has been the difficulty in determining the angle at which the seismic source or generator should be positioned relative to the surface of the earth to produce the optimum shear waves while simultaneously producing the desired compressional waves. Manifestly, and despite the efforts to prevent the base plate from moving horizontally along the surface of the ground, such horizontal movement or translation will occur at some relative angular position of the generator.

Many factors contribute to the difficulty of determining the optimum angle. For example, the amount of energy being imparted, the configuration of the base plate and, particularly, the configuration of the portion of the base plate in intimate contact with the soil. The major problem lies in the varying soil conditions that are encountered while conducting the geological survey of even a relatively small area.

SUMMARY OF THE INVENTION:

An object of this invention is to provide an improved apparatus and method for use with angularly disposed impact-type seismic generators to determine the optimum angle of such generators to produce the maximum horizontally polarized shear waves.

This invention then provides, in one aspect, apparatus for maximizing shear wave generation in seismic generators that includes a base plate in engagement with the ground and a variable angle seismic generator for imparting seismic signals into the base plate. The apparatus comprises accelerometer means located on the base plate for sensing the acceleration of the base plate when the base plate is impacted by the generator and for generating a signal indicative of at least the horizontal acceleration of the base plate; means for receiving the signal and displaying the acceleration rate; and, means for changing the angular disposition of the generator relative to the base plate.

In another aspect, this invention provides an improved method for positioning an impact-type seismic signal generator to produce the maximum shear wave through a base plate. The method comprises the steps of placing the base plate in intimate contact with the ground; positioning the generator at any angle of inclination relative to a perpendicular to the surface of the ground; impacting the base plate with a generator; measuring the acceleration rate of the base plate in a direction generally parallel to the surface of the ground; comparing the acceleration rate with a predetermined value; and decreasing the angle if the acceleration rate is greater than the value and repeating the steps of impacting, measuring and comparing until the acceleration rate is less than the value.

A third aspect of the invention involves a method including the steps of fixing the angle of inclination; varying the impacting force created by the generator; and, measuring and comparing the rate of acceleration until the acceleration rate is less than the predetermined value.

A fourth aspect then involves a method wherein the alteration of impact force and angle of impact is combined so as to optimize both the vertical and lateral translation of the base plate.

Figure 1:
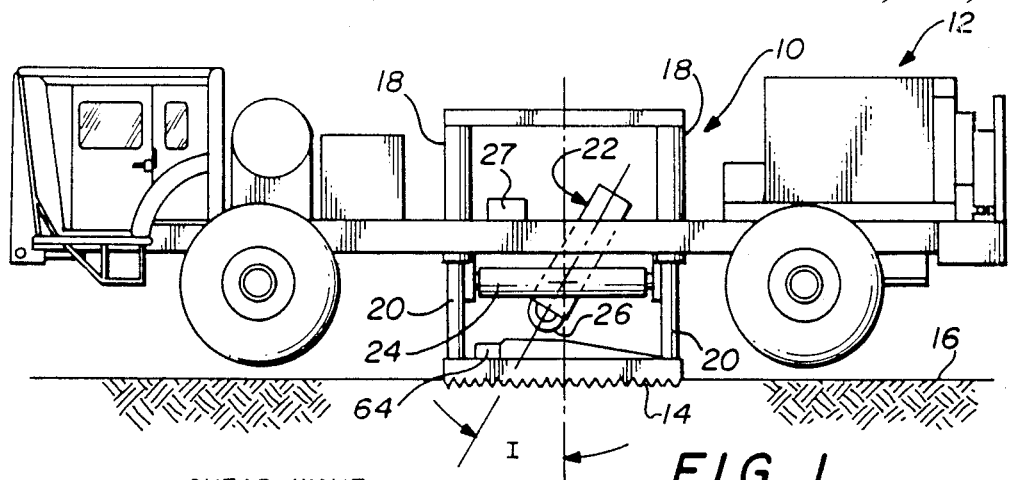
FIG. 1 is an elevation view, somewhat schematic, illustrating mobile seismic generating apparatus wherein the seismic generator can be tilted to produce shear waves.

DETAILED DESCRIPTION OF THE ILLUSTRATED EMBODIMENT:

In referring to the drawing and to FIG. 1, in particular, shown therein and generally designated by the reference character 10 is an impact-type seismic apparatus that is illustrated as being mounted on a vehicle 12. The vehicle 12 is utilized for the purpose of moving the seismic generator 10 from one location to the other when making a geological survey.

The seismic generator 10 includes a base plate 14 that is illustrated as being in engagement with the surface 16 of the ground. A plurality of cylinders 18 are connected through pistons 20 located therein to the base plate 14 for raising and lowering the base plate 14 and a seismic generator 22.

Figure 2:
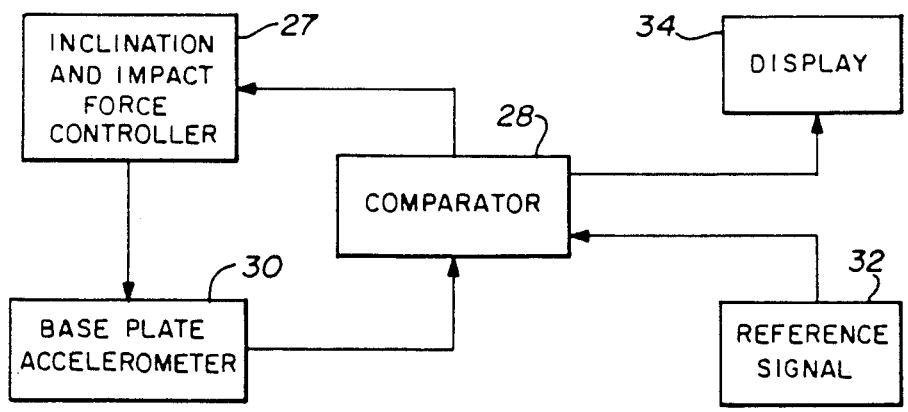
FIG. 2 is a schematic diagram of control apparatus for the seismic generator of FIG. 1 that is constructed in accordance with the invention.

As shown, the generator 22 is pivotally connected to a frame 24 and through the control system of FIG. 2, is positioned relative to the surface 16 of the ground to desired inclinations and azimuths. The seismic generator 22 includes an impact mass 26 that is arranged to be propelled at a high rate of speed into the base plate 14 to create the seismic signals.

FIG. 2 is a schematic diagram illustrating a control system that can be used in the seismic apparatus 10 illustrated in FIG. 1. U.S. Pat. No. 4,660,674, previously mentioned, illustrates apparatus for controlling the inclination and azimuth of the impact mass.

The inclination angle of the mass 26 impacting on base plate 14 is adjusted through the controller 27. When the base plate 14 is struck by the mass 26, its lateral acceleration is detected by an accelerometer 30. The output signal from the accelerometer 30 is sent to a comparator 28. A reference signal 32, is also sent to the comparator 28 as shown in FIG. 2.

The comparator 28 is designed so that it receives the signal generated by the accelerometer 30 located on the base pate 14 and compares that signal with the reference signal 32 which has a predetermined value. The signal from the accelerometer 30 is preferably indicative of the acceleration rate of the base plate 14 in a direction that is horizontal or generally parallel to the surface 16 of the ground.

A display 34 is connected to the comparator 28 and is provided to visually display the acceleration rate. The reference signal 32 has a predetermined value that has been experimentally determined to be the tolerable acceleration rate of the base plate 14 in the horizontal direction.

The base plate 14 when impacted by the mass 26 will, although the weight of the vehicle 12 is setting thereon, move laterally or horizontally along the surface 16 for an instant. If the angle of inclination of the generator 22 is not too great, the resilience of the soil in intimate contact with the base plate 14 will restore the base plate 14 immediately to virtually its initial position. However, upon the initial movement an acceleration rate will be indicated by the accelerometer 30 and a signal indicative thereof will be transmitted to the comparator 28.

Figure 3:
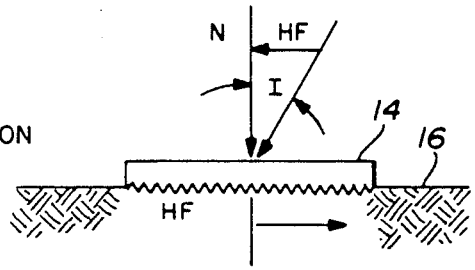
FIG. 3 is a diagram illustrating the forces acting on the base plate.

The force diagram of FIG. 3 illustrates the forces acting on the base plate 14 that will cause the acceleration rate thereof as well as causing movement along the surface 16 of the ground. In the diagram, the vector N should be considered to be a combination of the hold down weight as well as the vertical component of the force F that is generated by the impact of the impact mass 26. In the diagram, the angle I represents the angular disposition of the center line of the impactor or signal generator 22 from a line substantially perpendicular to the surface 16 of the ground.

The force F also generates a horizontal force which is designated by the vector HF. This force tends to cause the base plate 14 to move along the surface 16 in the direction of the arrow. When the force vector HF is sufficiently small, or the angle I relatively small, the base plate 14 will not move since it will be opposed by force HF' which is exactly opposite and of the same magnitude as the force HF.

The magnitude of the force HF' can be calculated from an equation $HF' = N * C * \tan(I)$. In the equation, C represents the coefficient of friction between the base plate 14 and the soil 16. The coefficient of friction, C, will be determined by soil conditions as noted hereinafter.

From the foregoing, it can be seen that the force opposing movement of the base plate 14 is the force HF'. The magnitude of the force HF' is limited by soil characteristics, C, which depends on soil types, e.g. sandy; loamy; clayey; the amount of moisture included therein; vegetation; etc. Thus, for a particular angle I and holddown force N, the applied force HF necessary to exceed the soil shear strength, HF', varies greatly, but when exceeded will result in lateral movement of the base plate 14.

In the equation cited above, the coefficient of friction C goes through a change from static friction to kinetic friction when lateral movement of the base plate 14 occurs. Since the coefficient of kinetic friction is less than static friction, the shear wave generation which is governed by the magnitude of the force HF', decreases very rapidly. Thus, the object is to increase the HF' or, on the other hand, decrease HF to the point where HF' produces the optimum shear wave energy into the soil. This will occur just prior to lateral movement of the base plate 14.

Figure 4:
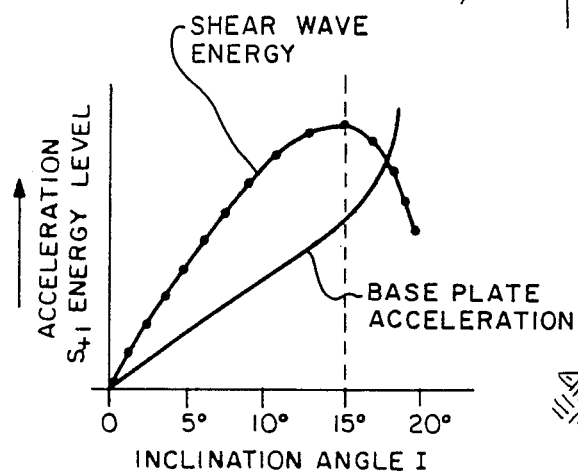
FIG. 4 is a graph illustrating the effect of an inclination angle and acceleration rate on the shear wave energy imparted into the soil.

The foregoing is illustrated by the curves of FIG. 4. One curve is designated "base plate acceleration" and is plotted against the inclination angle I of the generator 22. It will be understood, of course, that a family of the curves will result because of the differing characteristics of soil in which the apparatus 10 will be operated. For purposes of illustration, it can be seen that, starting from 0° inclination angle, base plate acceleration increases as a function of increasing angle I.

In the hypothetical case depicted here, inclination angle is increased in small increments until an angle slightly over 20 degrees is reached. Notice that at an inclination of about 15° the figure shows that the acceleration increases sharply. Coincidently, the curve designated as "shear wave energy" illustrates the energy of shear waves imparted to this soil at various angles of inclination I. Again, it will be understood that a family of curves varying with soil conditions will be generated. In the illustrated shear wave energy curve, it will be noted that the energy imparted increases at a fairly constant rate until the point at which the rapid base plate acceleration occurred. This acceleration marks the onset of rapid lateral sliding of the base plate 14. At this point, and since the base plate 14 is moving, and hence frictionally uncoupled from the soil, little if any shear wave energy will be imparted into the ground by the impact of the mass 26.

OPERATION OF THE ILLUSTRATED EMBODIMENT

When it is desired to conduct a seismic survey of a given area, the vehicle 12 or a plurality thereof will be driven to the site and placed in the desired position for impacting the soil to generate the seismic signal. An array of receiving devices are spaced around the area in a predetermined fashion to receive the seismic signals generated.

Upon reaching the location, the cylinders 18 are actuated driving the pistons 20 and the base plate 14 downwardly until the base plate 14 engages the surface 16 of the ground. Continued downward movement of the pistons 20 lifts the vehicle 12 so that the entire weight of the vehicle 12 is placed on the base plate 14.

If the desired data relating to the soil on which the base plate 14 is situated is not available, it will be necessary to go through a procedure to determine the maximum angle (I) at which the generator 22 can be positioned to provide the maximum shear wave energy in the seismic signal. To determine the maximum angle (I) possible, the generator 22 is tilted sequentially in small steps to increasing inclination angles ranging from 0 degrees vertical, that is, from a line that is substantially perpendicular to the surface 16 of the ground out to the maximum angle possible. At each angle the generator 22 is actuated to cause the mass 26 to engage the base plate 14.

Observing the display 34 of the horizontal acceleration rate of the base plate 14, will disclose whether or not horizontal translation or movement of the base plate has occurred. The onset of such translation will be signaled by a rapid increase in the acceleration rate. Also, it may be possible to simply look at the position of base plate 14 and determine whether or not a substantial shift or translation of the base plate 14 has occurred.

If the acceleration of the base plate 14 is in the region of rapid change, it is evident that the inclination angle I is too large. Accordingly, the angle I will be reduced by a small predetermined amount and impactor mass 26 again activated. As before, observation of the display 34 indicates whether or not the desired acceleration has been exceeded. If so, successive reductions in the angle I can be taken until the acceleration rate of the base plate 14 is in the desired range.

If appropriate soil data is available, an estimated angle I for the maximum shear wave energy can be determined. The generator 22 is set at that angle I and the initial shot taken. Again, the display 34 can be observed to determine on which side of the critical point the acceleration rate lies. The foregoing procedure will be repeated then until the maximum angle I is determined for the particular soil conditions.

In continuing the seismic exploration, the vehicles 12 are moved to additional locations and during the moves, the soil conditions change. With each change in soil condition, either the soil data may be utilized to reset the angle of the generator 22 or the experimental procedure for determining the maximum angle I can be repeated.

The foregoing method describes a manual procedure for determining the maximum angle I. It will also be possible in utilizing the apparatus illustrated in FIG. 2 to automatically go through the same procedure. For example, the horizontal acceleration rate of the base plate 14 above the predetermined value causes the accelerometer 30 to transmit a signal to the comparator 28 which then sends an output signal to the controller 27. Controller 27 may incorporate a microcomputer designed to automatically reduce either the inclination angle or impact force based on information provided by the comparator 28 to reposition the generator 22. The main advantage to having the automatic system in operation is that as soil changes are encountered, the comparator will constantly monitor the acceleration rate via the signal from the accelerometer 30 and will automatically adjust the angle of the generator 22 to compensate for soil changes encountered. Further, the computerized controller 27 may be programmed to periodically vary the inclination angles in small increments centered about the current angle to test and insure the angle employed is the optimum for that particular location.

When it is desired to move the vehicle 12 from one position to another, it will be apparent that the cylinders 18 must be actuated to raise the pistons 20 therein thereby lower the vehicle 12 until the wheels engage the surface 16 of the ground. When this occurs, further actuation of cylinders 18 lifts the base plate 14 clear of the surface 16 and permits movement of the vehicle 12.

From the foregoing, it will be apparent that there is provided apparatus and methods wherein the proper angle for the generator 22 can be established whereby the impact mass 26 upon engagement with the base plate 14 will generate the maximum shear wave energy in accordance with the soil conditions.

It will be understood that the foregoing detailed description of but a single embodiment of the invention is presented by way of example only and that many changes and modifications can be made thereto without departing from the spirit or scope of the invention.

What is claimed is:

1. Apparatus for maximizing shear wave generation in impact-type seismic generators that include a base plate in engagement with the ground and a variable angle seismic generator for imparting seismic signals into the base plate, said apparatus comprising:
   accelerometer means located on said base plate for sensing the horizontal acceleration rate of said base plate and generating a signal indicative of the acceleration rate;
   display means for receiving said signal and displaying said acceleration rate; and,
   positioning means for changing the angular disposition of the generator relative to the base plate in response to the signals generated by the accelerometer means.

2. Apparatus for maximizing shear wave generation in impact-type seismic generators that include a base plate in engagement with the ground and a variable angle seismic generator for imparting seismic signals into the base plate, said apparatus comprising:
   accelerometer means located on said base plate for sensing the acceleration rate of said base plate when said base plate is impacted by said generator and for transmitting a first signal indicative of at least the horizontal acceleration rate of said base plate;
   means for receiving and comparing said first signal to a second signal corresponding to a predetermined acceleration rate; and
   means for generating a third signal indicative of whether said first signal is equal to, less than or greater than said second signal.

3. The apparatus of claim 2 and also including means for varying the angle of said seismic generator relative to a perpendicular to the surface of the ground.

4. The apparatus of claim 3 wherein said means for changing the angular disposition includes means responsive to said third signal for varying the angle of said generator.

5. The apparatus of claim 1 and also including control means for varying the impacting force said generator imparts into said base plate.

6. A method for positioning an impact type seismic signal generator at an angle to produce the maximum shear wave energy through a base plate located in intimate contact with the ground when impacted by an angularly disposed, impact type seismic signal generator, said method comprising the steps of:

measuring the acceleration rate of said base plate in a direction generally parallel to the surface of said ground;

comparing said acceleration rate with a predetermined value; and decreasing said angle if said accelerate rate is greater than said value and repeating the steps of impacting, measuring, and comparing until said acceleration rate is less than said value.

7. A method for positioning an impact type seismic signal generator at an angle to produce the maximum shear wave energy through a base plate, said method comprising the steps of:

placing said base plate in intimate contact with the ground;

positioning said generator at an angle of between 0 degrees and 45 degrees relative to perpendicular to the surface of said ground;

impacting said base plate with said generator;

measuring the acceleration rate of said base plate in a direction generally parallel to the surface of said ground;

comparing said acceleration rate with a predetermined value; and, decreasing said angle if said acceleration rate is greater than said value and repeating the steps of impacting, measuring and comparing until said acceleration rate is less than said value.

8. The method of claim 7 and including the steps of:

increasing said angle if said acceleration rate is less than said value and repeating the impacting, measuring and comparing steps until said acceleration rate is greater than said value; and, repositioning said generator at an angle slightly less than the angle at which the acceleration rate exceeds said predetermined value.

9. A method for positioning an impact type seismic signal generator at an angle to produce the maximum shear wave energy through a base plate, said method comprising the steps of:

placing said base plate in intimate contact with the ground;

positioning said generator at an angle of between 0 degrees and 45 degrees relative to perpendicular to the surface of said ground;

impacting said base plate with said generator;

measuring the acceleration rate of said base plate in a direction generally parallel to the surface of said ground;

comparing said acceleration rate with a predetermined value; and, reducing the impact force if said acceleration rate is greater than said value and repeating the steps of impacting, measuring, and comparing until said acceleration rate is less than said value.

* * * * *